US011045841B2

(12) United States Patent
Bauer et al.

(10) Patent No.: US 11,045,841 B2
(45) Date of Patent: Jun. 29, 2021

(54) DEVICE FOR SORTING OUT CONTAINERS WHICH WERE APPLIED AN INCORRECT PRINT BY A DIRECT PRINTING MACHINE

(71) Applicant: KRONES AG, Neutraubling (DE)

(72) Inventors: Veronika Bauer, Regensburg (DE); Franz Weigl, Pfakofen (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/644,944

(22) PCT Filed: Aug. 3, 2018

(86) PCT No.: PCT/EP2018/071176
§ 371 (c)(1),
(2) Date: Mar. 5, 2020

(87) PCT Pub. No.: WO2019/048155
PCT Pub. Date: Mar. 14, 2019

(65) Prior Publication Data
US 2020/0361717 A1  Nov. 19, 2020

(30) Foreign Application Priority Data

Sep. 8, 2017 (DE) ..................... 10 2017 215 927.8

(51) Int. Cl.
*B07C 5/34* (2006.01)
*B41J 3/407* (2006.01)
(Continued)

(52) U.S. Cl.
CPC .............. *B07C 5/3404* (2013.01); *B07C 5/36* (2013.01); *B41J 3/40731* (2020.08);
(Continued)

(58) Field of Classification Search
CPC ........ B65G 43/08; B65G 47/49; B65G 47/64; B65G 47/82; B65G 47/846;
(Continued)

(56) References Cited

U.S. PATENT DOCUMENTS 4,369,873 A * 1/1983 Heuft ..................... B07C 5/362
198/367
5,941,366 A * 8/1999 Quinlan ............... B65G 17/002
198/465.1
(Continued)

FOREIGN PATENT DOCUMENTS

DE        69729923 T2  12/2004
DE    102009011058 A1   9/2010
(Continued)

OTHER PUBLICATIONS

ISA European Patent Office, International Search Report Issued in Application No. PCT/EP2018/071176, dated Nov. 22, 2018, WIPO, 4 pages.

*Primary Examiner* — Gene O Crawford
*Assistant Examiner* — Keith R Campbell
(74) *Attorney, Agent, or Firm* — McCoy Russell LLP

(57) ABSTRACT

The invention provides a device for sorting out containers which were applied an incorrect print by a direct printing machine. The device comprises a transport device for transporting pucks, which are adapted to transport containers, along a transport path away from the direct printing machine, where the transport path comprises at least a primary transport path and a secondary transport path, an inspection device for inspecting the print on the containers, a decoupling device, in particular comprising a pusher system or a slider system, for decoupling pucks from the primary transport path to the secondary transport path, and a control device adapted to control the decoupling device
(Continued)

such that pucks with containers, for which the inspection device has detected an incorrect print, are decoupled to the secondary transport path.

12 Claims, 2 Drawing Sheets

(51) Int. Cl.
| | |
|---|---|
| *B07C 5/36* | (2006.01) |
| *B65G 47/49* | (2006.01) |
| *B65G 47/64* | (2006.01) |
| *B65G 47/82* | (2006.01) |
| *B65G 47/84* | (2006.01) |
| *B65G 47/68* | (2006.01) |
| *B65G 43/08* | (2006.01) |

(52) U.S. Cl.
CPC ............. *B65G 47/49* (2013.01); *B65G 47/64* (2013.01); *B65G 47/82* (2013.01); *B65G 47/846* (2013.01); *B41J 3/4073* (2013.01); *B65G 43/08* (2013.01); *B65G 2047/685* (2013.01); *B65G 2201/0261* (2013.01); *B65G 2203/0216* (2013.01); *B65G 2203/041* (2013.01)

(58) Field of Classification Search
CPC ...... B65G 2047/685; B65G 2201/0261; B65G 2203/0216; B65G 2203/041; B07C 5/3404; B07C 5/3408; B07C 5/3412; B07C 5/36; B41J 3/4073; B41J 3/40731
See application file for complete search history.

(56) References Cited

U.S. PATENT DOCUMENTS

| | | | | |
|---|---|---|---|---|
| 5,979,635 | A  * | 11/1999 | Calhoun | B65G 47/82 |
| | | | | 198/349.5 |
| 6,522,945 | B2 * | 2/2003 | Sleep | G06Q 10/087 |
| | | | | 700/225 |
| 7,013,624 | B2 * | 3/2006 | Zwilling | B65C 9/0062 |
| | | | | 53/131.4 |
| 8,132,664 | B2 * | 3/2012 | Paskell | B65G 17/002 |
| | | | | 198/803.14 |
| 9,120,328 | B2 * | 9/2015 | Lindner | B07C 5/3408 |
| 9,272,850 | B2 * | 3/2016 | Goudy | B65G 47/82 |
| 9,649,856 | B2 * | 5/2017 | Lindner | B41J 3/4073 |
| 9,844,846 | B2 * | 12/2017 | Terzini | B23Q 1/032 |

FOREIGN PATENT DOCUMENTS

| | | |
|---|---|---|
| DE | 102012214381 A1 | 2/2014 |
| DE | 102014216576 A1 | 2/2016 |
| DE | 202016104631 U1 | 11/2016 |
| DE | 102015211770 A1 | 12/2016 |
| DE | 102015114344 A1 | 3/2017 |
| WO | 2013178418 A1 | 12/2013 |
| WO | 2016071444 A1 | 5/2016 |

* cited by examiner

DEVICE FOR SORTING OUT CONTAINERS WHICH WERE APPLIED AN INCORRECT PRINT BY A DIRECT PRINTING MACHINE

CROSS-REFERENCE TO RELATED APPLICATIONS

The present application is a U.S. National Phase of International Patent Application Serial No. PCT/EP2018/071176 entitled "DEVICE FOR REMOVING CONTAINERS WHICH ARE PRINTED INCORRECTLY IN A DIRECT PRINTER," filed on Aug. 3, 2018. International Patent Application Serial No. PCT/EP2018/071176 claims priority to German Patent Application No. 10 2017 215 927.8 filed on Sep. 8, 2017. The entire contents of each of the above-referenced applications are hereby incorporated by reference for all purposes.

TECHNICAL FIELD

The invention relates to a device for sorting out containers which were applied an incorrect print by a direct printing machine.

BACKGROUND AND SUMMARY

It is known to transport containers to and from a direct printing machine standing upright along a transport path, for example, on conveyor belts. After the containers have been applied a print, automated print inspection is typically performed to detect containers which were applied an incorrect print. If a container with an incorrect print is detected, it is removed from the transport path in an automated manner. For example, the container can be simply pushed out of the flow of containers, for example, from a conveyor belt, down to a discard collection area.

However, there are containers which have formats with which upright transport, for example on a conveyor belt, is not readily possible for the reason that the containers do not stand in a stable manner or for the reason that they cannot be aligned well in a precise manner. It is known to transport such containers upright in pucks. One container is transported upright in a respective puck. For this purpose, the pucks comprise receptacles in which the containers stand upright and in which their walls support the containers laterally. For applying a print, the containers are removed from the pucks and then inserted back into the pucks.

However, the problem there is that sorting out discard cannot be done like with containers that are standing freely upright.

The invention is therefore based on the object of providing a device and a method that allow for reliably and efficiently sorting out discard for containers transported in pucks.

This object is satisfied by the subject matter of the independent claims.

The device for sorting out containers which were applied an incorrect print by a direct printing machine comprises a transport device for transporting pucks, which are adapted to transport containers, along a transport path away from the direct printing machine, where the transport path comprises at least a primary transport path and a secondary transport path, an inspection device for inspecting the print on the containers, a decoupling device, in particular comprising a pusher system or a slider system, for decoupling pucks from the primary transport path to the secondary transport path, and a control device adapted to control the decoupling device such that pucks with containers, for which the inspection device has detected an incorrect print, are decoupled to the secondary transport path.

The advantage of such a device is that containers which were applied an incorrect print can be sorted out reliably and in an automated manner in a way that allows the pucks to be easily reused after the removal of the containers which were applied an incorrect print, for example, be supplied to the primary transport path.

Where in the following the formulation is used that a transport path is adapted to transport the pucks, it is meant that the pucks are transported along the transport path, even if the transportation itself is carried out with conveying elements.

The containers can be, for example, bottles, where different formats are conceivable, for example, containers having a base area that is round, oval, elongated with rounded ends or polygonal.

The pucks can in principle be arbitrarily shaped transport elements in which the containers are transported upright, where the pucks are adapted such that the containers standing upright therein are supported and stabilized laterally Basically, the containers can be transported standing upright on their base or their upper side.

The transport device comprises one or more conveying elements, where each conveying element can in principle be any element for conveying pucks, in particular a conveyor belt or a conveyor chain. The pucks can be guided laterally by rails at least in sections of the path. For this purpose, the pucks can in particular also comprise grooves in the outer wall with which the rails engage. In this way, the pucks can be transported in a stable manner having a defined orientation. The transport device can be adapted such that it comprises at least a conveying element for the secondary transport path and a conveying element for the primary transport path, where the conveying elements are in particular operable independently of each other.

In addition to transporting the pucks from the direct printing machine, the primary transport path can also be adapted to transport the pucks in from other system regions to the direct printing machine.

It is conceivable that several secondary transport paths are provided, for example, for second and third quality containers.

The pusher system can comprise a pusher that can be moved into the puck's transport path when triggered, so that pucks are pushed from the side and thereby deflected. The pusher system can be controllable by way of the control device, in particular in such a way that the pusher element is triggered in an automated manner controlled by the control device. The slider system can comprise a sliding element that can be controllable by way of the control device, in particular, in such a way that the sliding element is triggered in an automated manner controlled by the control device. The sliding element can be adapted such that it pushes a puck onto the secondary transport path when triggered.

The control device can be connected via data connections to the elements to be actuated by it, for example, contactless or wired connections.

The decoupling device can be arranged in a decoupling section, where in particular a guide and/or at least one puck lock, for example in the form of a stopper or locking star, and/or a switch, can further be arranged in the decoupling section. Such additional elements make the sorting out process even more reliable.

The guide can be formed, for example, as a rod, a rail, or a travelling belt. For example, a guide can be adapted to split transport branches. For this purpose, the guide can be formed, for example, V-shaped. Alternatively or in addition, a guide can be provided which is arranged laterally on the secondary transport path such that pucks decoupled from the primary transport path, in particular pucks pushed by the pusher system, cannot fall over or drop down.

The secondary transport path and optionally the primary transport path can be adapted to transport pucks to a removal section. The removal section is a region where containers are removed from the pucks. The removal section can have its own transport path. Alternatively, the removal section can be a section through which the secondary transport path and/or the primary transport path run. In particular, the removal section can respectively comprise a portion of the primary transport path and the secondary transport path, on which pucks with containers which were applied an incorrect print can in this case be stored.

The device can comprise a removal device for removing the containers by machine from the pucks in the removal section. In particular, both the secondary transport path as well as the primary transport path can be adapted to transport pucks to a joint removal section. This has the advantage that the device saves space. In this case, only one joint removal device can possibly be provided.

The primary transport path can be adapted to transport pucks to the removal section and the device can comprise a first deflection device, which is configured such that whether pucks are transported from the primary transport path or from the secondary transport path into the removal section is adjustable by means of the first deflection device.

This means that both the secondary transport path as well as the primary transport path are adapted to transport pucks to a joint removal section and that it is possible to use the deflection device to automatically adjust whether pucks with containers which were applied a correct print or pucks with containers which were applied an incorrect print are transported into the removal section. In this way, discard containers can be reliably sorted out in a simple manner although there is only one joint removal section.

The control device can be adapted to control the first deflection device such that only pucks from the primary transport path or only pucks from the secondary transport path enter the removal section in a predetermined period of time.

This allows the discard containers to be sorted out in an automated manner and not accidentally faultless containers as well, and that all (recognized) discard containers are reliably sorted out, since only faultless or only faulty containers enter the removal section during the period of time. The fact that the period of time is predetermined does not necessarily mean that a fixed value is set in advance for the period of time. The period of time is predetermined such that containers from the primary transport path and from the secondary transport path are not present in the removal section at the same time during operation. The period of time can arise, for example, from how many pucks have already been decoupled, for example, from the fact that there is no room for more pucks in the secondary transport path, and these pucks are transported to the removal section and emptied there. While this is the case, the transportation of pucks from the primary transport path to the removal section can be interrupted.

The secondary transport path can be adapted to transport the pucks to a merging device, whereby the merging device is adapted to merge pucks into the primary transport path, in particular in the direction of transport upstream of the inlet of the direct printing machine.

This has the advantage that, after removing the containers which were applied an incorrect print, the pucks can continue to be used in a very simple manner. In the case of feeding upstream of the direct printing machine, this can be done, for example, when empty pucks are needed in the primary transport path. This can be the case, for example, when the direct printing machine is emptied when empty pucks have to be resupplied for the last containers in the direct printing machine, depending on the configuration of the transport device.

The device can comprise a second deflection device which is adapted such that it is adjustable whether pucks are transported from the removal section to the merging device or to another system region.

This allows the empty pucks to be reused in a flexible manner. In particular, it can be useful to keep only a certain number of pucks for merging in upstream of the direct printing machine and to transport the remaining pucks away to other system regions.

The first and/or the second deflection device can each comprise at least one switch and/or at least one guide and/or at least one puck lock, for example in the form of a stopper or locking star.

The switches or guides can guide the flow of pucks. An inflow of pucks can be stopped and started efficiently and precisely in time by the puck lock. A switch has the advantage that it can simultaneously guide the pucks from one transport branch and stop them from the other transport branch.

The decoupling device can comprise one or the pusher system, respectively, where the pusher system is adapted to push the pucks from a conveyor belt of the primary transport path onto a conveyor belt of the secondary transport path.

The conveyor belt of the primary transport path is referred to in the following as the first conveyor belt and that of the secondary transport path as the second conveyor belt. The conveyor belts are each conveying elements of the transport device.

The first conveyor belt and the second conveyor belt in the decoupling section can run in parallel, in particular directly adjoining each other. "Directly adjoining each other" in this application means that adjacent conveyor belts are arranged at such a small distance that a puck can run from one onto the other conveyor belt.

Between the first conveyor belt and the second conveyor belt, one or more further conveyor belts can also run in parallel and directly adjoining the adjacent conveyor belts. This arrangement is advantageous for bridging any possible difference in the transport speed of the pucks along the primary transport path and the secondary transport path.

The invention also relates to a method for sorting out containers which were applied an incorrect print by a direct printing machine.

The method comprises transporting pucks, which are adapted to transport containers and in which containers which were applied a print are standing, along a transport path away from a direct printing machine, where the transport path comprises a primary transport path and a secondary transport path, inspecting a print on the containers and decoupling pucks with containers, for which it was detected that they were applied an incorrect print, from the primary transport path to the secondary transport path.

The method can comprise supplying pucks from the secondary transport path and optionally from the primary transport path to a removal section. The method can comprise in particular removing containers from the pucks manually and/or by machine in the removal section.

The method can comprise that only pucks from the primary transport path or from the secondary transport path are supplied to the removal section in a predetermined period of time.

The method can comprise that pucks with containers which were applied a correct print are supplied to the removal section and that the pucks with containers which were applied an incorrect print are stored in the secondary transport path until there is no more room for pucks in the secondary transport path, and the stored pucks are then transported to the removal section, but no pucks from the primary transport path. The secondary transport path can optionally have storage areas where the pucks can collect.

This has the advantage that the shared removal section is used particularly efficiently.

The method can comprise that empty pucks from the removal section are merged in a merging section into the primary transport path, in particular in the direction of transport upstream of the direct printing machine.

The methods described above can respectively be carried out by use of one of the devices described above.

The invention also relates to the use of one of the devices described above for carrying out one of the methods described above.

It is understood that the features and advantages mentioned in the context of the device are also applicable to the method and the use.

BRIEF DESCRIPTION OF THE FIGURES

Further features and advantages shall be explained below using the exemplary figures, where.

DETAILED DESCRIPTION

Figure 1:
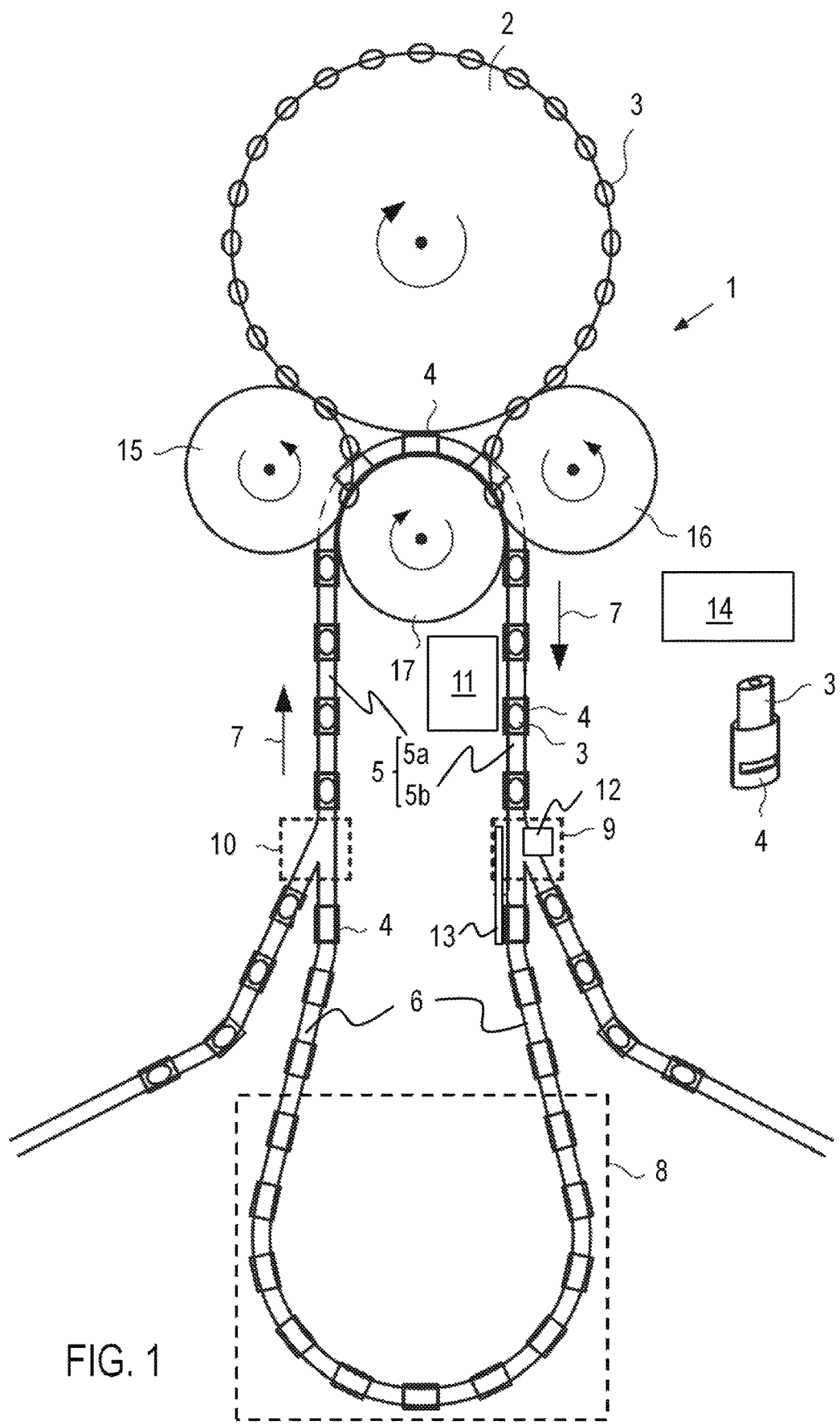
FIG. 1 shows a schematic not-to-scale top view onto a first device for sorting out containers which were applied an incorrect print in a direct printing machine and FIG. 2 shows a schematic not-to-scale top view onto a second device for sorting out containers which were applied an incorrect print in a direct printing machine.

FIG. 1 shows a first device 1 for sorting out containers 3 which were applied an incorrect print by a direct printing machine 2. The containers are transported in pucks 4 along a transport path that comprises a primary transport path 5 and a secondary transport path 6. In this example, the primary transport path has a first portion 5a and a second portion 5b. Pucks with containers which are to be applied a printed are transported during operation along the first portion to the direct printing machine and pucks are transported during operation along the second portion away from the direct printing machine. The direction of transport is indicated with arrow 7. The pucks are presently conveyed by way of example using conveying elements in the form of conveyor belts. Alternatively or in addition, other types of conveying elements can also be provided.

FIG. 1 also shows a section 8 which represents the removal section in which containers can be removed from the pucks. In the figure presently shown, the removal section comprises portion of the secondary transport path. Alternatively, the removal section can also respectively comprise a portion of the primary transport path and the secondary transport path on which pucks with containers which in this case were applied an incorrect print can be stored. In this case, a robot, for example, a portal robot or an articulated arm robot, can remove the containers without faults from the pucks in the portion of the primary transport path in the removal section while pucks with containers which were applied an incorrect print are collected in the secondary transport path. If there is time, this robot can also remove containers from pucks in the portion of the secondary transport path in the removal section and transport them, for example, to a disposal region.

Furthermore, a section 9 on the outlet side and a section 10 on the inlet side are shown. Section 9 is referred to as the decoupling section, since pucks can be there be decoupled from the primary transport path (from the second portion 5b) to the secondary transport path. Section 10 is also referred to in the following as the merging section, since pucks can there be merged in from the secondary transport path into the primary transport path (into first portion 5a). However, this section is optional. The pucks can also be transported to other sections of the system or simply remain in the removal section.

Furthermore, FIG. 1 shows an inspection device 11 for inspecting the print on the containers. For example, the inspection device can comprise at least one camera system, in particular two camera systems, which allows inspecting the front side and the rear side without rotating the container. The inspection device can also comprise a turntable and/or a positioning element to orient the container appropriately for the inspection and, where appropriate, to re-adjust it. However, the inspection device can also be formed in any other way as long as a container which was applied an incorrect print can be identified therewith.

FIG. 1 additionally shows schematically a decoupling device 12 for decoupling pucks from the primary transport path to the secondary transport path in the decoupling section. In this example, it comprises a pusher system. The pusher system is adapted such that it gives pucks in the decoupling section an impetus or a push, which pushes the pucks onto the conveyor belt of the secondary transport path. This can be done with a pusher (push element). As an alternative to a pusher system, a slider system with a sliding element can also be provided. Optionally, a delimitation 13 can be provided, for example, a guide or a railing that prevents the puck from dropping down from the conveyor belt into the secondary transport path. Other and/or additional guides that direct and support the puck flow are also possible.

However, it should be noted that, although a variant has presently been described in which two conveyor belts are provided in the decoupling region, there can indeed be more conveyor belts provided there, in particular three or four, where the additional conveyor belt/s is/are arranged between the first conveyor belt and the second conveyor belt. This has the advantage that the additional conveyor belts can possibly bridge a speed difference between the first and the second conveyor belt.

In addition, FIG. 1 schematically shows a control device 14 adapted to control the decoupling device in such a way that pucks with containers, for which the inspection device has detected an incorrect print, are decoupled into the secondary transport path. The control device can in particular be adapted to control when the pusher is triggered to decouple a puck.

For this purpose, the control device can have a data connection to the inspection device and the decoupling device, so that the decoupling device can be actuated based on data from the inspection device. For example, the control device can be adapted to receive signals from the inspection device signaling that a puck with a container which was applied an incorrect print has been detected. The decoupling device can then be actuated based on the signals, in particular the pusher is triggered to decouple the puck. It is also conceivable that the control device receives non-processed or only partially processed data from the inspection device and by itself determines based thereupon that a container was applied an incorrect print. Alternatively, this can also be carried out by a separate computing device, which is connected to the inspection device and the control device via a data connection.

In the merging region (presently not shown in detail), switches and/or rails and/or stoppers can be provided which can be adjusted in particular by way of the control device such that either pucks which are transported from other system parts along the primary transport path are passed through or pucks from the secondary transport path are merged in. In particular, the flow of pucks from other system parts can be interrupted by way of the respectively controlled switches or rails or stoppers during the merging process.

Also shown in the figure by way of example are an infeed starwheel 15, an outlet starwheel star 16 and an intermediate starwheel 17. The intermediate star wheel is preferably formed in the form of a lifting starwheel which grips the containers, lifts them from the pucks, passes them to the infeed starwheel and then receives containers from the outlet starwheel and inserts them back into a puck. The infeed starwheel and the direct printing machine are arranged and adapted such that the infeed starwheel transfers containers to the direct printing machine in which the containers are transported and applied a print, for example, printed. The outlet starwheel is adapted and arranged such that it receives containers from the direct printing machine after they have passed through the direct printing machine and passes them to the lifting starwheel which then inserts the containers into the pucks. However, this setup of the direct printing machine as well as of its inlet and outlet is purely by way of example. The invention can also be used similarly for direct printing machines that are configured differently.

Furthermore, FIG. 1 shows by way of example a puck with a container in an oblique view. The puck by way of example comprises grooves. If such grooves are provided, the puck can be guided at least temporarily by rails that engage in the grooves. However, this is not mandatory.

Figure 2:
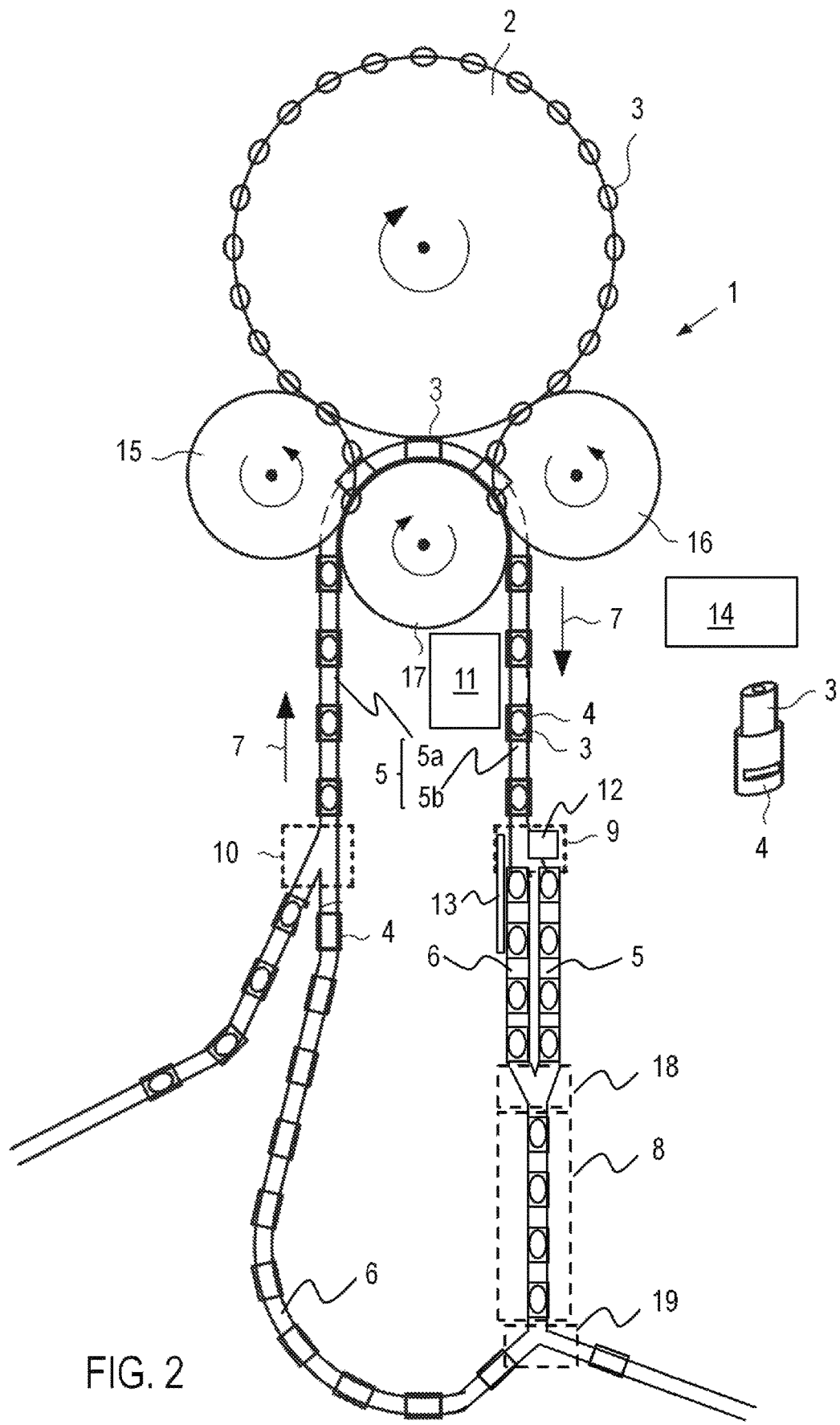

FIG. 2 shows a second embodiment of a device for sorting out containers which were applied an incorrect print by a direct printing machine The same or similar elements are labeled with the same reference signs as in FIG. 1 and are not described again.

In the embodiment shown in FIG. 2, the primary transport path, the secondary transport path, as well as removal section 8 are arranged and adapted such that pucks from the primary transport path and from the secondary transport path can basically be transported into this joint removal section.

FIG. 2 shows a joining section 18 in which the primary transport path and the secondary transport path are joined to the removal section.

The joining section comprises a first deflection device which is adapted such that it is adjustable whether pucks are transported from the primary transport path or from the secondary transport path to the removal section. The first deflection device can comprise one or more elements, for example, a switch and/or at least one guide and/or at least one puck lock, for example, in the form of a stopper or locking star, which, however, are presently not shown detail.

On the other side of the removal section, a second deflection device can optionally be provided in a region 19 which is adapted such that it is adjustable whether pucks are transported from the removal section to the merging device or to another system region. However, such a division and the respective deflection device can also be dispensed with.

The elements of the first and the second deflection device can also each be controlled by the control device. In particular, the elements of the first deflection device, i.e. in the joining section, can be actuated in such a way that only pucks from the primary transport path or from the secondary transport path are transported to the removal section in a predetermined period of time.

A method for sorting out containers which were applied an incorrect print by a direct printing machine shall now be described below which can be carried out, for example, with the devices described above or with comparable devices.

Prior to the method for sorting out the containers, containers are transported along the direction of transport standing upright in pucks in the direction toward the direct printing machine. At the inlet of the direct printing machine, the containers are removed from the pucks and transferred to the direct printing machine. The containers are applied a print in the direct printing machine. After having passed through the direct printing machine, the containers are reinserted into pucks.

The method for sorting out comprises that the pucks with the containers having the print applied are transported along the primary transport path away from the direct printing machine and the print on the containers is inspected, for example, by way of one of the inspection devices described above.

When containers with an incorrect print are detected, then the pucks with these containers are decoupled from the primary transport path to a secondary transport path.

The pucks of the secondary transport path are transported to a removal section and there the faulty containers are removed by machine or manually. They can then be collected separately from the containers without faults.

The pucks thus emptied can then optionally be supplied back to the primary transport path by merging them back into the primary transport path at a suitable location and at an appropriate point in time.

If the removal section is a joint removal section to which pucks from the secondary transport path and from the primary transport path are supplied, then the pucks with the containers which were applied a correct print can be transported into the removal section and the containers can be removed and possibly packaged or further processed. The pucks with the containers which were applied an incorrect print can be collected during this time in the secondary transport path, which can also comprise a collection region, for example, until there is no more space there or until the batch is finished. The transportation of pucks with containers which were applied a correct print from the primary transport path to the removal section can then be interrupted and the pucks with the containers which were applied an incorrect print can be transported to the removal section. Once all containers which were applied an incorrect print have been removed, the empty pucks can be transported away, and pucks from the primary transport path can again enter the removal section.

Decoupling the pucks can be carried out with a pusher system, for example, the pusher system described above, where a puck is pushed with the pusher system from a conveyor belt of the primary transport path onto a conveyor belt of the secondary transport path, or be carried out with a slider system.

If a merging section is provided, then empty pucks can optionally be merged in, for example at the end of a batch of containers upstream of the direct printing machine from the secondary transport path into the primary transport path in such a way that the last containers of the batch are inserted into the pucks merged in from the secondary transport path after having passed through the direct printing machine.

It is understood that the features mentioned in the embodiments described above are not restricted to these specific combinations and are also possible in any other combination.

The invention claimed is:

1. Device for sorting out containers which were applied an incorrect print by a direct printing machine, comprising:
 a transport device for transporting pucks, which are adapted to transport containers, along a transport path away from the direct printing machine, where the transport path comprises at least a primary transport path and a secondary transport path,
 an inspection device for inspecting a print on the containers,
 a decoupling device for decoupling pucks from the primary transport path to the secondary transport path, and
 a control device adapted to control the decoupling device such that pucks with containers for which the inspection device has detected an incorrect print are decoupled to the secondary transport path,
 where the secondary transport path is adapted to transport the pucks to a merging device, where the merging device is adapted to merge pucks into the primary transport path, in a direction of transport upstream of an inlet of the direct printing machine.

2. Device according to claim 1, where the decoupling device is arranged in a decoupling section, where a guide and/or at least one puck lock are further arranged in the decoupling section.

3. Device according to claim 2, where the secondary transport path and/or the primary transport path are adapted to transport pucks to a removal section.

4. Device according to claim 3, where the primary transport path is adapted to transport pucks to the removal section and where the device comprises a first deflection device, which is configured such that whether pucks are transported from the primary transport path or from the secondary transport path into the removal section is adjustable by means of the first deflection device.

5. Device according to claim 4, where the control device is adapted to control the first deflection device such that only pucks from the primary transport path or only pucks from the secondary transport path enter the removal section in a predetermined period of time.

6. Device according to claim 1, wherein the device comprises a second deflection device which is adapted such that whether pucks are transported from a removal section to the merging device or to another system region is adjustable via the second deflection device.

7. Device according to one of the claim 4, where the first and/or a second deflection device each comprise at least a switch and/or at least a guide and/or at least a puck lock.

8. Device according to claim 1, where the decoupling device comprises a pusher system, where the pusher system is adapted to push the pucks from a conveyor belt of the primary transport path onto a conveyor belt of the secondary transport path.

9. Method for sorting out containers which were applied an incorrect print by a direct printing machine, comprising:
 transporting pucks, which are adapted to transport containers and in which containers which were applied a print are standing, along a transport path away from the direct printing machine, where the transport path comprises at least a primary transport path and a secondary transport path,
 inspecting the print on the containers,
 decoupling pucks with containers detected to have an incorrect print from the primary transport path to the secondary transport path,
 providing a supply of pucks from the secondary transport path and/or from the primary transport path to a removal section, and
 removing containers from the pucks manually and/or by machine in the removal section.

10. Method according to claim 9, where only pucks from the primary transport path or from the secondary transport path are supplied to the removal section in a predetermined period of time.

11. Method according to claim 10, where with containers which were applied a correct print are supplied to the removal section and pucks with containers which were applied an incorrect print are stored in the secondary transport path until there is no more room for pucks in the secondary transport path, and subsequently the stored pucks, but no pucks from the primary transport path, are transported to the removal section.

12. Method according to claim 11, where empty pucks from the removal section are merged in a merging section into the primary transport path in the direction of transport upstream of the direct printing machine.

* * * * *